(12) United States Patent
Leonard et al.

(10) Patent No.: US 10,744,837 B2
(45) Date of Patent: Aug. 18, 2020

(54) END MEMBER ASSEMBLIES AND GAS SPRING ASSEMBLIES INCLUDING SAME

(71) Applicant: Firestone Industrial Products Company, LLC, Nashville, TN (US)

(72) Inventors: Joshua R. Leonard, Noblesville, IN (US); Stephen C. Street, Carmel, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/578,363

(22) PCT Filed: May 31, 2016

(86) PCT No.: PCT/US2016/035077
§ 371 (c)(1),
(2) Date: Nov. 30, 2017

(87) PCT Pub. No.: WO2016/196502
PCT Pub. Date: Dec. 8, 2016

(65) Prior Publication Data
US 2018/0147906 A1 May 31, 2018

Related U.S. Application Data

(60) Provisional application No. 62/169,549, filed on Jun. 1, 2015.

(51) Int. Cl.
*B60G 11/27* (2006.01)
*B60G 11/28* (2006.01)
*F16F 9/05* (2006.01)

(52) U.S. Cl.
CPC ............. *B60G 11/27* (2013.01); *B60G 11/28* (2013.01); *F16F 9/057* (2013.01); *B60G 2202/152* (2013.01); *B60G 2206/424* (2013.01)

(58) Field of Classification Search
CPC .. B60G 11/27; B60G 11/28; B60G 2202/152; B60G 2206/424; B60G 15/12; F16F 9/057; F16F 9/05
See application file for complete search history.

(56) References Cited

U.S. PATENT DOCUMENTS

| 5,129,634 A | * | 7/1992 | Harris | B60G 15/14 |
| | | | | 267/64.24 |
| 6,290,244 B1 | * | 9/2001 | Hosoya | B60G 11/28 |
| | | | | 280/124.157 |

(Continued)

FOREIGN PATENT DOCUMENTS

| DE | 202012104483 | * | 1/2013 | ....... B60G 2202/242 |
| EP | 0259245 | | 3/1988 | |

(Continued)

OTHER PUBLICATIONS

International Search Report and Written Opinion for corresponding PCT application No. PCT/US2016/035077 dated Aug. 24, 2016.

*Primary Examiner* — Xuan Lan Nguyen
(74) *Attorney, Agent, or Firm* — Brian D. McAlhaney; Matthew P. Dugan

(57) ABSTRACT

An end member assembly includes first and second end member sections. The first end member section includes a first securement feature integrally formed thereon. The second end member section includes a second securement feature integrally formed therein that is dimensioned to cooperatively engage the first securement feature. In an assembled condition, the first and second end member sections are operatively engaged to substantially inhibit axial displacement therebetween. A substantially fluid-tight joint can be formed between the first and second end member sections such that an end member chamber can be formed within the end member assembly. A third end member section can be included, and can be operatively connected to the second end member section. A gas spring assembly and a suspension system are also included.

20 Claims, 6 Drawing Sheets

(56) References Cited

U.S. PATENT DOCUMENTS

| | | | |
|---|---|---|---|
| 2006/0055094 A1* | 3/2006 | Attinello | B60G 11/28 267/64.27 |
| 2010/0127438 A1* | 5/2010 | Eise | F16F 9/057 267/124 |
| 2014/0061984 A1* | 3/2014 | Hart | B60G 11/28 267/64.27 |
| 2014/0239606 A1* | 8/2014 | Koeske | F16F 9/057 280/124.16 |
| 2015/0035213 A1* | 2/2015 | Stahmer | B60G 11/27 267/64.27 |

FOREIGN PATENT DOCUMENTS

| | | |
|---|---|---|
| SU | 954261 | 8/1982 |
| WO | WO 01/61207 | 8/2001 |

\* cited by examiner

END MEMBER ASSEMBLIES AND GAS SPRING ASSEMBLIES INCLUDING SAME

BACKGROUND

The subject matter of the present disclosure broadly relates to the art of gas spring devices and, more particularly, to end member assemblies constructed from a plurality of end member sections that can be assembled together using integrally formed features. In an assembled condition, such end member assemblies are dimensioned for use in forming gas spring assemblies. Additionally, suspension systems can include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

In some cases, the spring devices can take the form of gas spring assemblies that utilize pressurized gas as the working medium. Gas spring assemblies of various types, kinds and constructions are well known and commonly used. Typical gas spring assemblies can include a flexible wall that is secured between comparatively rigid end members and/or end member assemblies.

Generally, it is possible to reduce the spring rate of gas spring assemblies, thereby improving ride comfort, by increasing the volume of pressurized gas operatively associated with the gas spring assembly. This is commonly done by placing an additional chamber, cavity or volume filled with pressurized gas into fluid communication with the primary spring chamber of the gas spring assembly. In some cases, the additional volume can be formed within one of the end members of the gas spring assembly. In such cases, two or more end member components are often permanently secured together to form a substantially fluid-tight chamber within the end member. Such constructions often undesirably include manufacturing and assembly steps and/or processes that can disadvantageously increase factors such as production time, tooling and equipment costs, and post-assembly operations.

Notwithstanding the broad usage and overall success of the wide variety of end member constructions that are known in the art, it is believed that a need exists to confront one or more of these competing goals, to overcome other disadvantages of known constructions and/or otherwise advance the art of gas spring devices while still retaining comparable or even improving factors such as performance, ease of manufacture, ease of assembly, ease of installation and/or cost of manufacture.

BRIEF SUMMARY

One example of an end member assembly in accordance with the subject matter of the present disclosure can be dimensioned for securement to an associated flexible spring member for forming an associated gas spring assembly. The end member assembly can include a first end member section that can include a first section wall extending peripherally about the longitudinal axis. The first section wall can include a mounting wall portion that is dimensioned to receivingly engage the associated flexible spring member. A first outer wall portion can be disposed radially outward of the mounting wall portion and can include a first outer surface portion and a first inner surface portion. A first securement feature can be integrally formed on or along the first section wall. A second end member section can include a second section wall that can extend peripherally about the longitudinal axis. The second section wall can include a second outer wall portion that can extend longitudinally between a first end disposed toward the first end member section and a second end disposed away from the first end member section relative to the first end. The second outer wall portion can include a second outer surface portion and a second inner surface portion. A second securement feature can be integrally formed on or along the second section wall. The second securement feature can be dimensioned to cooperatively engage the first securement feature such that in an assembled condition of the first and second end member sections the first and second securement features can operatively engage one another to substantially inhibit axial displacement of the first and second end member sections relative to one another. Additionally, the first and second outer surface portions can form a smooth and substantially continuous outer surface axially along at least a portion of the end member assembly. Furthermore, the first and second inner surface portions can at least partially define an end member chamber.

In some cases, an end member assembly according to the foregoing paragraph can also include a third end member section that can include a third section wall extending peripherally about the longitudinal axis. The third end member section can be disposed in operative engagement with the second end member section along the second end of the second section wall. In some cases, a substantially fluid-tight seal can be formed between the second and third end member sections. Additionally, or in the alternative, the second end member section can include a third securement feature integrally formed on or along the second section wall. In such case, the third end member section can include a fourth securement feature formed on or along the third section wall. The fourth securement feature can be dimensioned to cooperatively engage the third securement feature such that in an assembled condition of the second and third end member sections, the third and fourth securement features operatively engage one another to substantially inhibit axial displacement of the second and third end member sections relative to one another.

One example of a gas spring assembly in accordance with the subject matter of the present disclosure can include a flexible spring member having a longitudinal axis. The flexible spring member can include a flexible wall extending peripherally about the longitudinal axis between a first end and a second end of the flexible spring member such that a spring chamber can be at least partially defined by the flexible spring member between the first and second ends. An end member can be secured across the first end of the flexible spring member such that a substantially fluid-tight seal is formed therebetween. An end member assembly according either of the foregoing two paragraphs can be secured across the second end of the flexible spring member such that a substantially fluid-tight seal is formed therebetween.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source through the control device.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
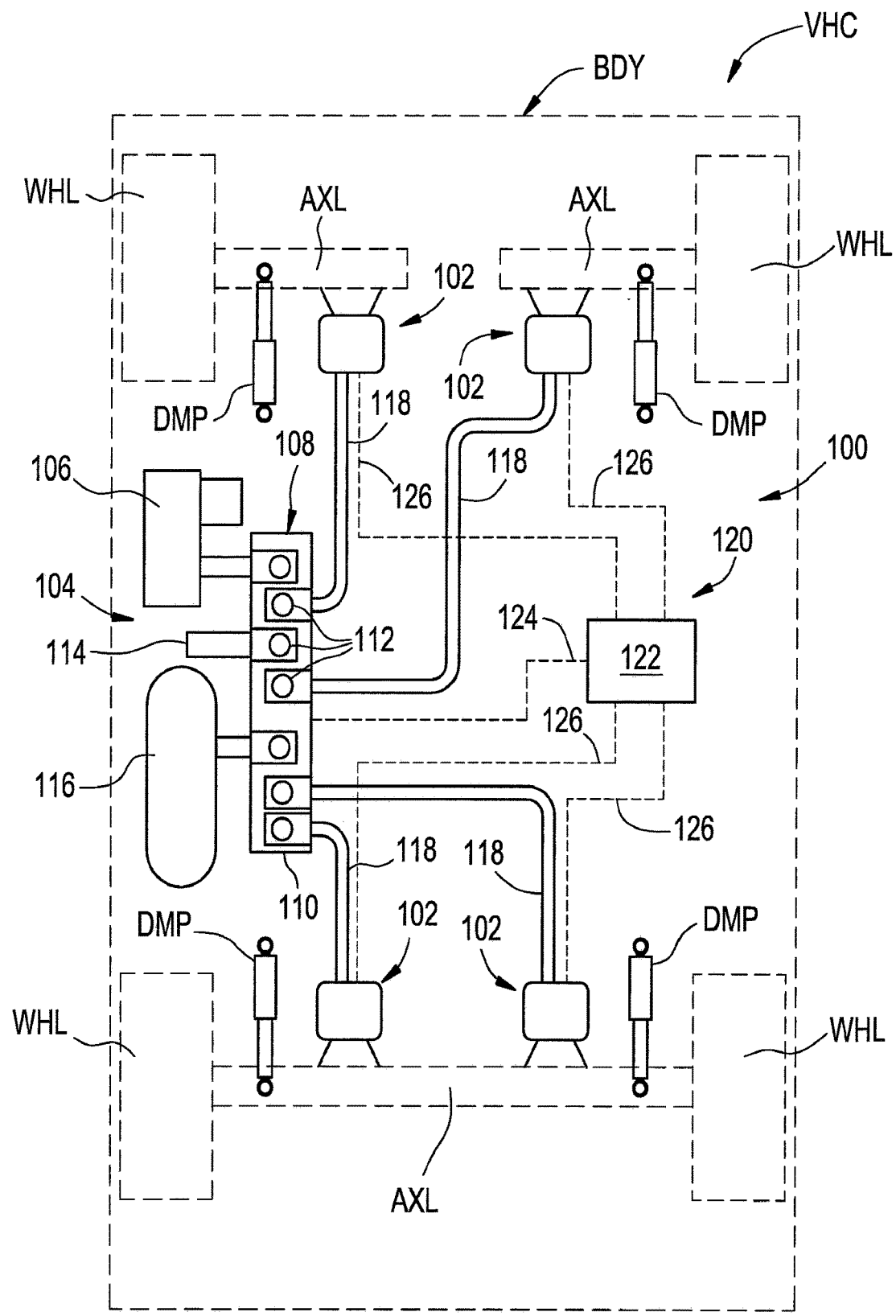
FIG. 1 is a schematic representation of one example of a suspension system of an associated vehicle including a gas spring assembly in accordance with the subject matter of the present disclosure.
Figure 2:
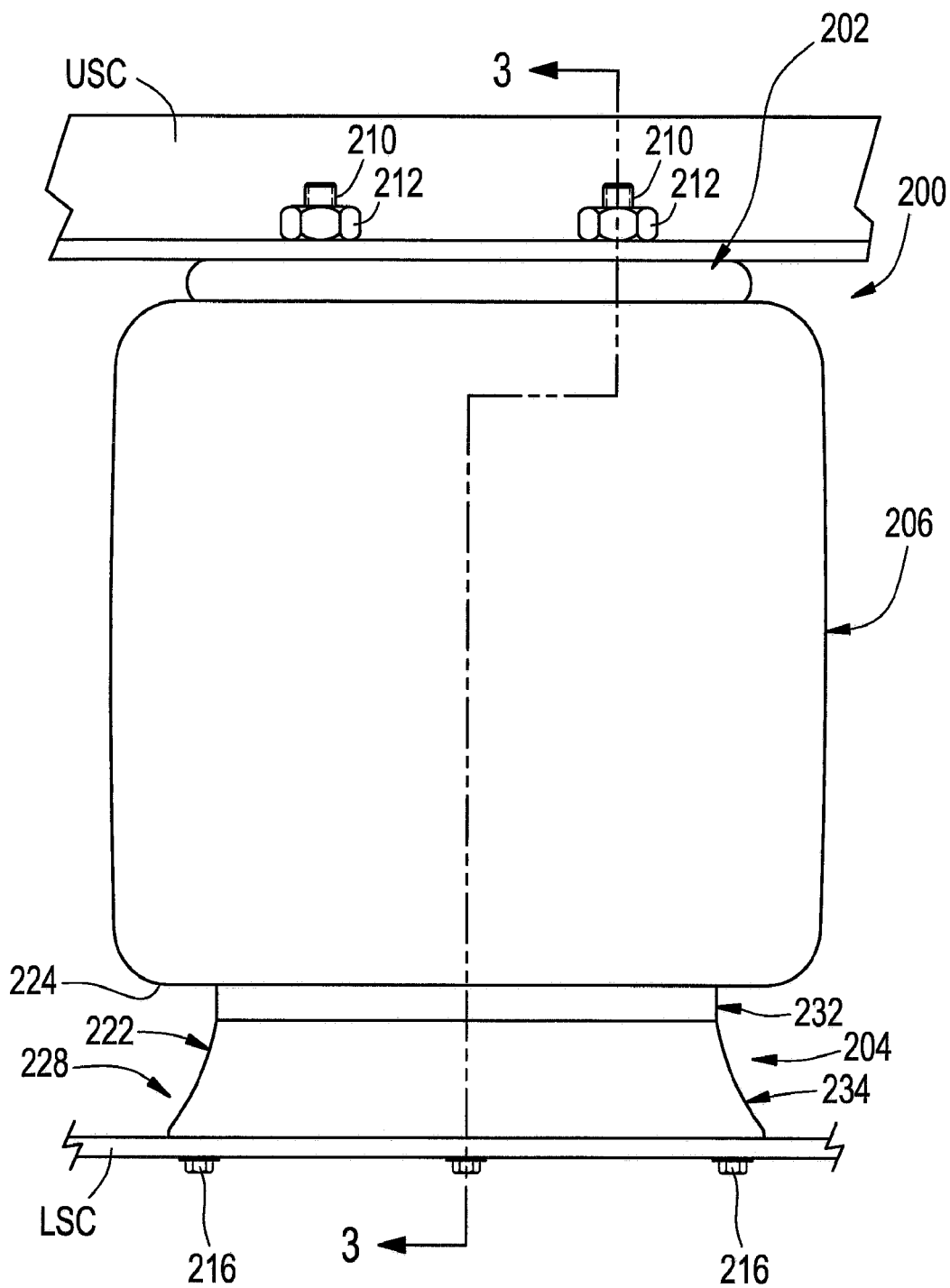
FIG. 2 is a side elevation view of one example of a gas spring assembly that includes one example of an end member assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can also, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

One example of a gas spring assembly 200 in accordance with the subject matter of the present disclosure is shown in FIGS. 2-6 as having a longitudinally-extending axis AX (FIG. 3) and can include one or more end members, such as an end member 202 and an end member 204 (which may also be referred to herein as an end member assembly) that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner such that a substantially fluid-tight connection is formed therebetween. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member assembly 204 can be secured along a second or lower structural component LSC, such as an axle AXL in FIG. 1, in any suitable manner. As one example, lower structural component LSC could include one or more mounting holes HLS extending therethrough. In such case, a threaded fastener 216 could extend through one of mounting holes HLS and threadably engage end member assembly 204 (or one or more components thereof) to secure the end member assembly on or along the lower structural component.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate and is secured to a first end 218 of flexible wall 206 using a crimped-edge connection 220. End member assembly 204 is shown in the exemplary arrangement in FIGS. 2 and 3 as being of a type commonly referred to as a piston (or a roll-off piston) that has an outer surface 222 that abuttingly engages flexible spring member 206 such that a rolling lobe 224 is formed therealong. In a preferred arrangement, outer surface 222 is smooth and substantially continuous along at least a portion of end member assembly 204 such that, as gas spring assembly 200 is displaced between extended and collapsed conditions, rolling lobe 224 is displaced along outer surface 222 in a conventional manner with few, if any, discontinuities on or along the outer surface.

An end member assembly in accordance with the subject matter of the present disclosure can be formed from a plurality of end member components or sections that include integrally-formed interconnecting features. As such, an end member assembly in accordance with the subject matter of the present disclosure can be assembled without the use of welded joints between mating components. In particular, the inclusion or use of welded joints that are sufficiently robust to support or otherwise accommodate forces and loads acting in a generally axial direction can be avoided.

One example of a suitable construction for an end member assembly in accordance with the subject matter of the present disclosure is shown in FIGS. 2-6 as end member assembly 204. The end member assembly can extend from along a first or upper end 226 toward a second or lower end 228 that is spaced longitudinally from end 226. End member assembly 204 can include an end member component or section 230 that is disposed toward end 226 of the end member assembly and an end member component or section 232 that is operatively connected to end member section 230. Additionally, end member 204 is shown as including an, optional, end member section 234 disposed toward lower end 228. It will be appreciated, however, that in some constructions, one or more features of end member section 234 can, optionally, be included on or along end member section 232 without departing from the subject matter of the present disclosure.

End member section 230 can take the form of an upper section or cap of the end member assembly and, as such, can include one or more features suitable for operative engagement with an end of flexible spring member 206. For example, end member section 230 can include a section wall 236 that extends peripherally about axis AX. Section wall 236 can include an end wall portion 238 that is oriented transverse to axis AX. A mounting wall portion 240 can extend axially from along end wall portion 238 toward a distal edge 242. Mounting wall portion 240 can include an inner surface 244 that at least partially defines an opening 246 through end member section 230. Mounting wall portion 240 can also include an outer surface 248 that can be dimensioned to receive and form a substantially fluid-tight seal with an end 250 of flexible spring member 206. In some cases, an annular ridge or one or more projections 252 can extend radially outward beyond outer surface 248, such as may be useful for engaging or otherwise at least partially retaining end 250 of flexible spring member 206 on or along mounting wall portion 240.

End member section 230 can also include an outer side wall portion 254 that extends axially from along end wall portion 238 in a direction generally opposite distal edge 242 of mounting wall portion 240. Outer side wall portion 254 is disposed radially outward of mounting wall portion 240 and transitions to end wall portion 238 at a shoulder wall portion 256. Outer side wall portion 254 can extend from along shoulder wall portion 256 toward a distal surface or edge 258, and can include an outside surface 260 and an inside surface 262. In some cases, one or more features can extend radially into section wall 236 from along outside surface 260 and/or inside surface 262 of outer side wall portion 254. As one example, a securement area 264 (FIG. 4) can be formed along outside surface 260 of outer side wall portion 254 that includes a shoulder surface 266 extending radially inward from along outer surface 260.

Figure 3:
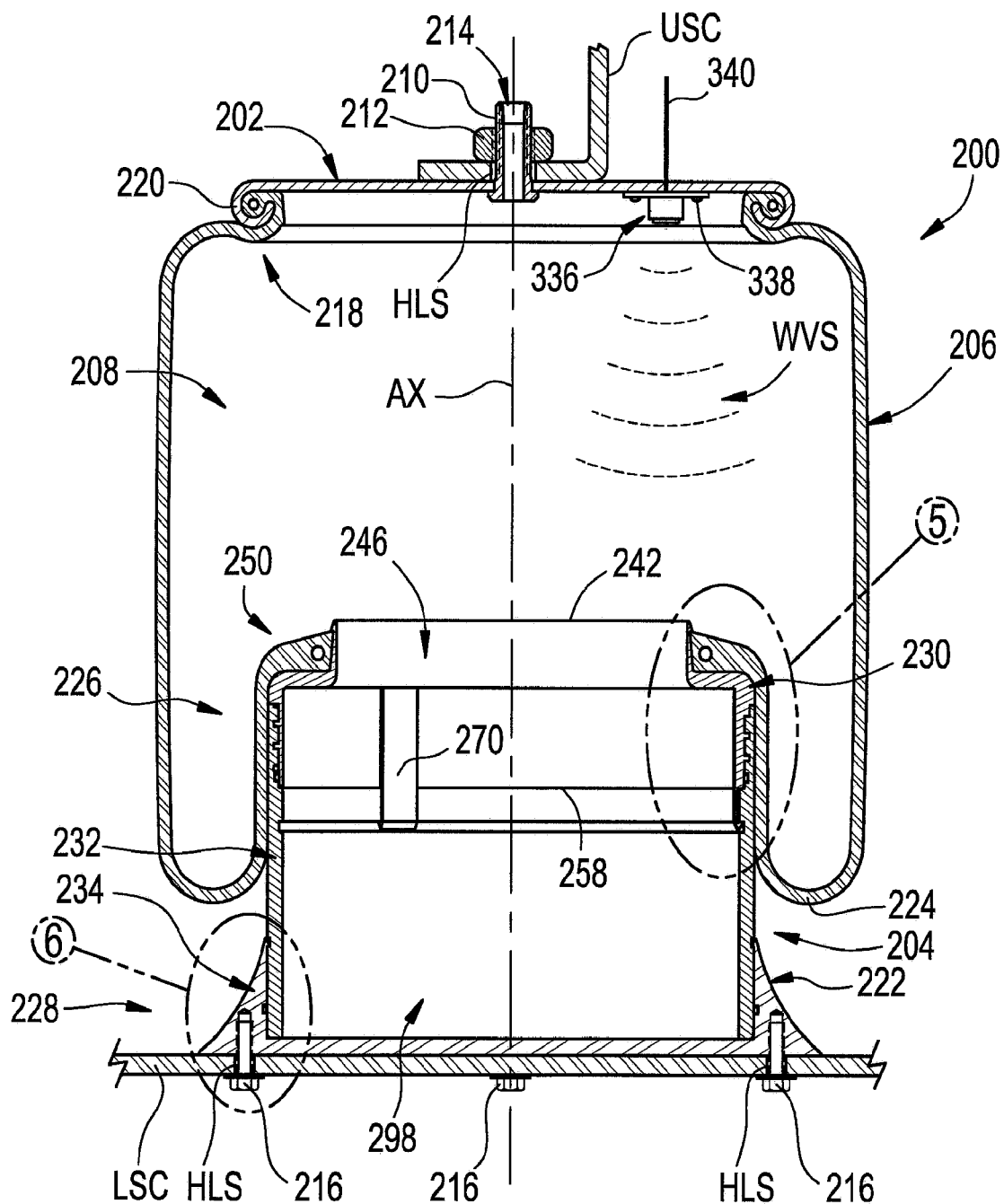
FIG. 3 is a cross-sectional side view of the gas spring assembly in FIG. 2 taken from along line 3-3 in FIG. 2.
Figure 4:
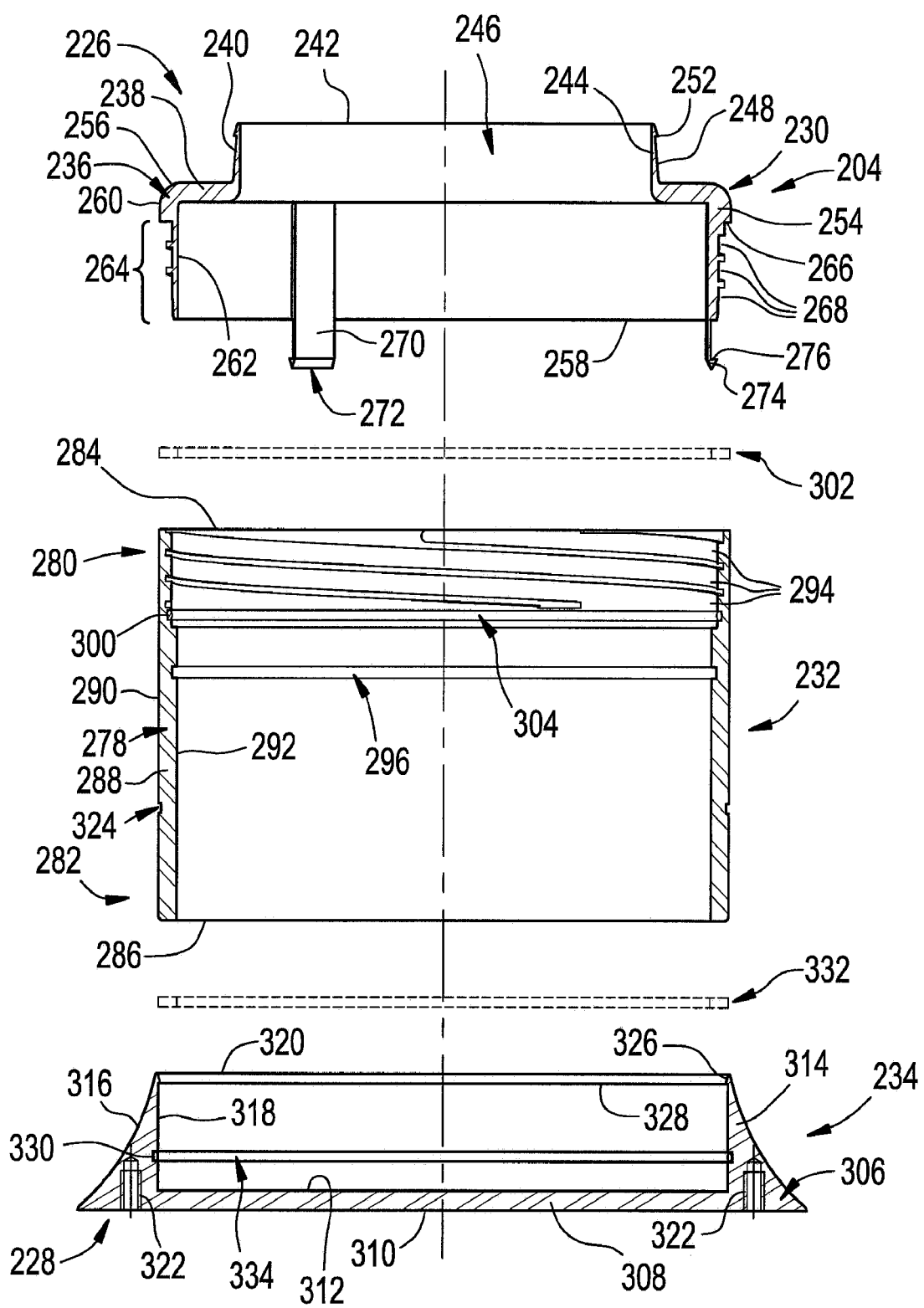
FIG. 4 is an exploded view of the end member assembly in FIGS. 2 and 3 shown prior to assembly.

End member section 230 can further include one or more securement features that are integrally formed on or along section wall 236. It will be appreciated that such one or more securement features can be of any suitable size, shape, type, kind, configuration and/or arrangement. For example, the one or more securement features can include one or more projections extending in a helical arrangement about longitudinal axis AX that together can form a somewhat thread-like configuration. Additionally, or in the alternative, the one or more securement features can include one or more grooves or groove segments extending helically about longitudinal axis AX. In the arrangement in FIGS. 3-5, end member section 230 is shown as including one or more helical threads 268 that extend into section wall 236. In some cases, the one or more securement features can be accessible from along the inside surface of outer side wall portion 254. Additionally, or in the alternative, the one or more securement features can be operatively accessible from along the outside surface, such as is shown in FIGS. 3-5, for example.

It will be appreciated that the aforementioned securement features can, in some cases, operate as primary securement features that substantially inhibit axial displacement when operatively connected with corresponding securement features of an adjacent end member section (e.g., end member section 232). In some cases, it may be desirable to include one or more secondary securement features that can assist in maintaining the primary securement features in engagement with one another or otherwise inhibit or at least reduce the inadvertent disengagement of the primary securement features. It will be appreciated that any suitable combination of features and/or elements can be used in such a capacity.

Figure 5:
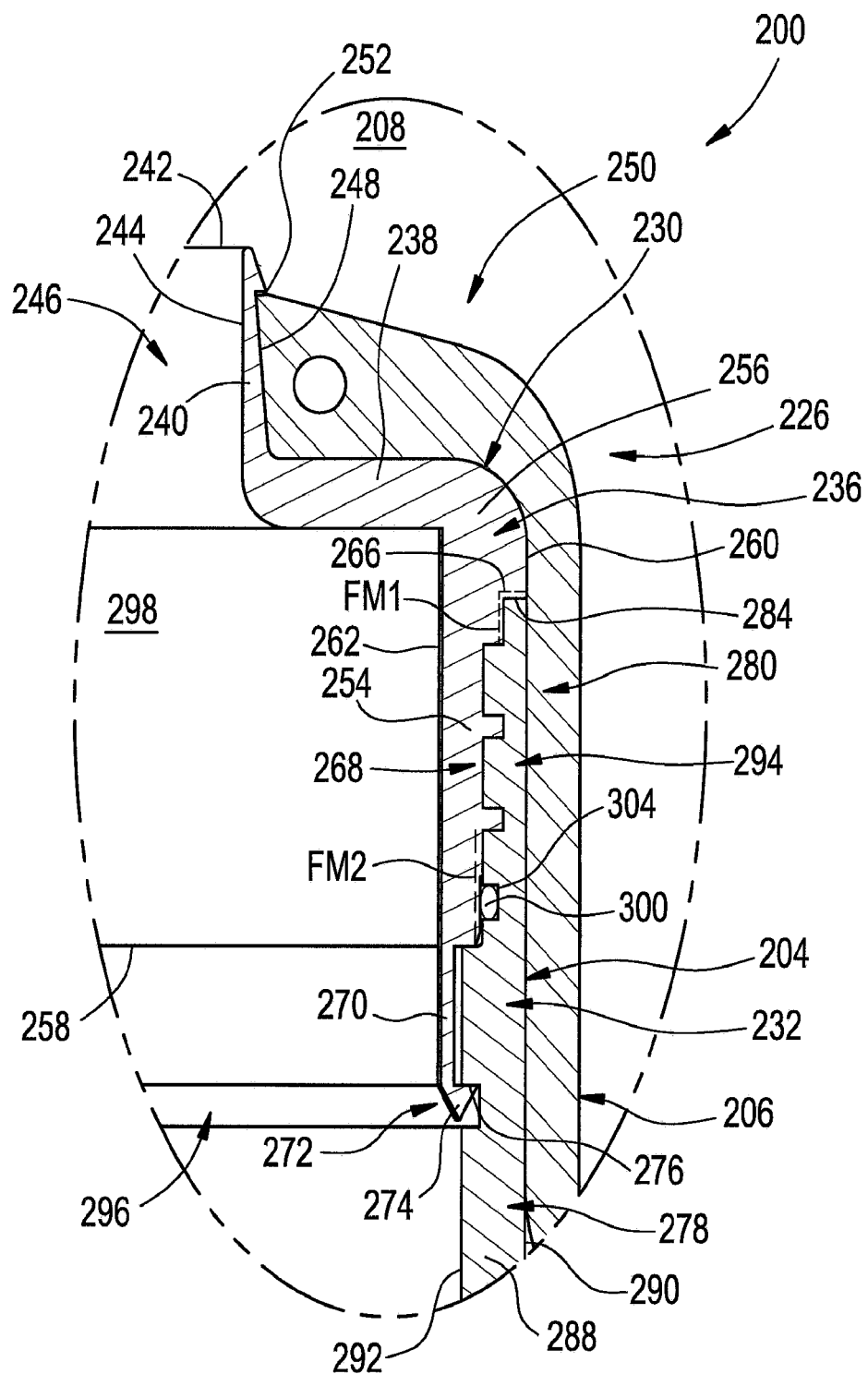
FIG. 5 is a greatly enlarged view of the portion of the end member assembly identified as Detail 5 in FIG. 3.
Figure 6:
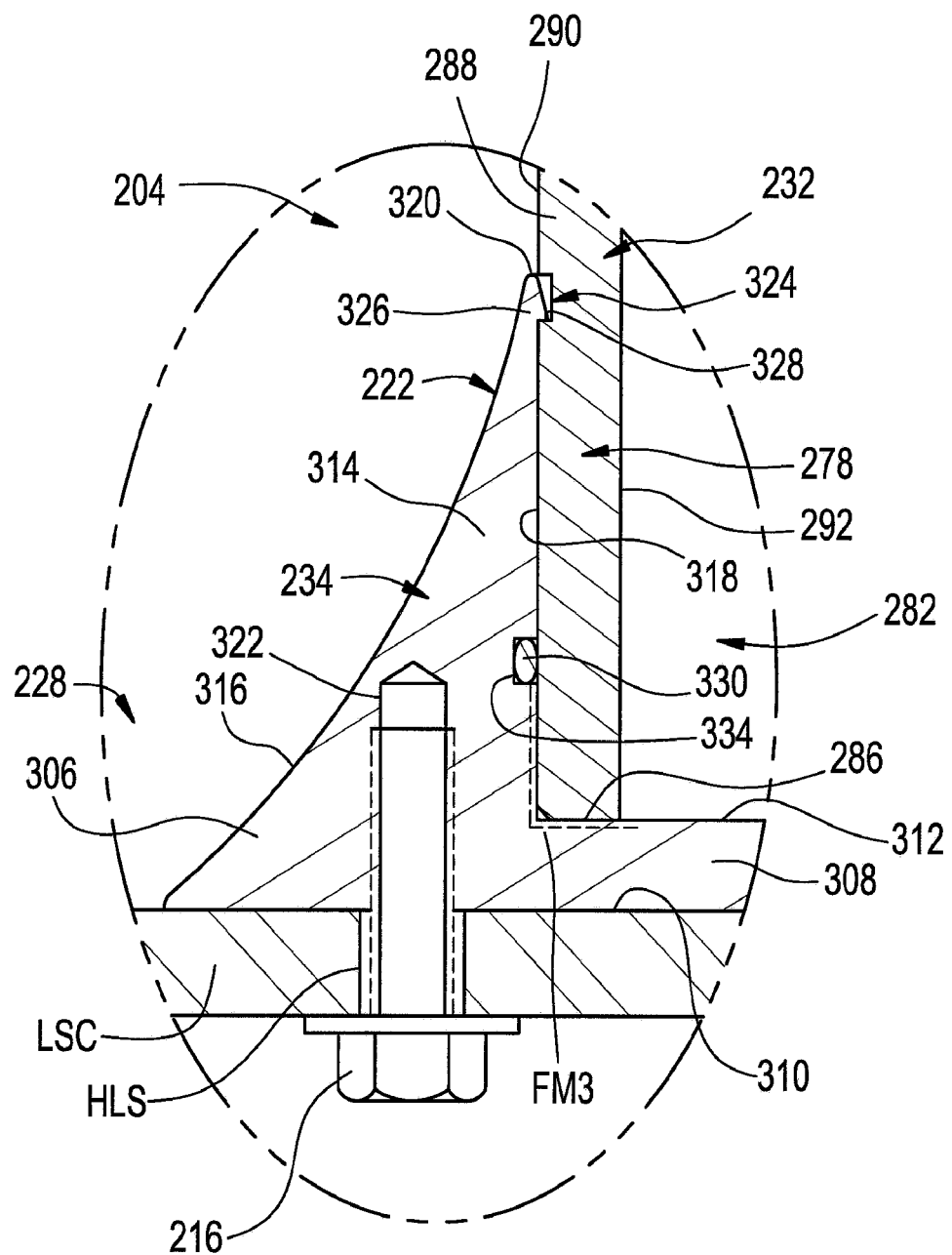
FIG. 6 is a greatly enlarged view of the portion of the end member assembly identified as Detail 6 in FIG. 3.

For example, a flowable adhesive material could be disposed between end member sections 230 and 232 and/or between end member sections 232 and 234 that is operative to substantially inhibit rotation of the first and second end member sections relative to one another and, thus, maintain the securement features thereof in engagement with one another, such as is represented in FIG. 5 by dashed lines FM1 and/or FM2 and/or in FIG. 6 by dashed line FM3, for example. Additionally, or in the alternative, one or more flowable materials FM1, FM2 and/or FM3 can take the form of a flowable sealant material that is operative to form a substantially fluid-tight joint on, along or otherwise between end member sections 230 and 232 and/or end member sections 232 and 234. In some cases, the flowable material can at least partially perform both adhesive and sealing functions and/or otherwise provide both features.

Additionally, or in the alternative, end member section 230 can include one or more retention arms 270 that extend from a fixed end (not numbered) disposed along distal edge 258 to a free end 272 spaced axially from the distal edge. In a preferred arrangement, a plurality of retention arms 270 are spaced radially about axis AX. The retention arms can include a projection 274 that extends radially outward (or inward, in other configurations) from along free end 272 and can include a shoulder surface 276 disposed in facing relation to distal edge 258.

End member section 232 can take the form of an intermediate or extension section that supports end member section 230 in spaced relation to the associated structural component, such as lower structural component LSC, for example. End member section 232 can include a section wall 278 that extends peripherally about axis AX and lengthwise between opposing ends 280 and 282. Section wall 278 can include a proximal surface or edge 284 disposed along end 280 and a distal edge 286 disposed along end 282. Section wall 278 can also include an outer side wall portion 288 with an outside surface 290 and an inside surface 292 extending therealong. In an assembled condition of end member sections 230 and 232, outer surfaces 260 and 290 can at least partially form a smooth and substantially continuous outer surface (e.g., outer surface 222) that extends peripherally around and axially along at least a portion of the end member assembly.

End member section 232 can also include one or more securement features that are integrally formed on or along section wall 278. It will be appreciated that such one or more securement features can be of any suitable size, shape, type, kind, configuration and/or arrangement. For example, the one or more securement features can include one or more projections extending from along the section wall and disposed in a helical arrangement about longitudinal axis AX such that the projections can at least partially form a somewhat thread-like configuration. Additionally, or in the alternative, the one or more securement features can include one or more grooves or groove segments extending helically about longitudinal axis AX. In the arrangement in FIGS. 3-5, end member section 232 is shown as including one or more helical threads 294 that extend into section wall 278. In some cases, the one or more securement features can be accessible from along the outside surface of outer side wall portion 288. Additionally, or in the alternative, the one or more securement features can be operatively accessible from along inside surface 292, such as is shown in FIGS. 3-5, for example.

In a preferred arrangement, helical threads 294 of end member section 232 are complementary to helical threads 268 of end member section 230 such that threads 268 and 294 can rotate into engagement with one another upon rotation of end member sections 230 and 232 relative to one another. It will be appreciated that such helical engaging elements (e.g., threads 268 and 294) can be of any suitable size, shape, configuration and/or arrangement suitable for providing a desired level of strength and/or rigidity under axially applied forces and/or load conditions. As such, it will be appreciated that end member sections 230 and 232 can be configured for rotation between a first orientation in which the securement features thereof (e.g., threads 268 and 294) are disengaged from one another and a second orientation in which the securement features are fully engaged with one another and axial displacement of the end member sections relative to one another is substantially inhibited. It will be appreciated any suitable amount or degree of angular displacement between the first and second orientations can be used. As one example, the amount or degree of angular displacement can be of any value within a range of from approximately 45 degrees (i.e., ⅛ of one full rotation) to approximate 2,160 degrees (i.e., six full rotations).

As discussed above, the aforementioned securement features can, in some cases, operate as primary securement features that substantially inhibit axial displacement when operatively connected with corresponding securement features of an adjacent end member section (e.g., end member section 230). As has also been discussed above, it may be desirable to include one or more secondary securement features that can assist in maintaining the primary securement features in engagement with one another or otherwise inhibit or at least reduce the inadvertent disengagement of the primary securement features.

Again, it will be appreciated that any suitable combination of features and/or elements can be used in such a capacity. For example, flowable adhesive and/or sealant materials FM1 and/or FM2 could be used, as discussed above. Additionally, or in the alternative, end member section 232 can include one or more radial recesses extend into section wall 278 that are dimensioned to receivingly engage at least a portion of the projections of the one or more retention arms. In some cases, such one or more radial recesses can take the form of a single annular recess or groove 296 that can extend into section wall 278, such as from along the outside surface or from along inside surface 292, as shown in FIGS. 3-5, for example. In a preferred arrangement, annular groove 296 can include at least one engagement surface (not numbered) disposed in facing relation to shoulder surface 276 of retention arms 270. In such case, abutting contact between the engagement surface of annular groove 296 and shoulder surface 276 of retention arms 270 can substantially inhibit inadvertent rotational displacement of end member sections 230 and 232 relative to one another by inhibiting the corresponding axial displacement that would result from any such relative rotational displacement.

Together, end member sections 230 and 232 can at least partially define an end member chamber 298 suitable for storing a quantity of pressurized gas at an elevated pressure (i.e., at a pressure level significantly above an associated atmospheric pressure level). In such cases, a substantially fluid-tight seal is preferably formed between end member sections 230 and 232. It will be appreciated that such a sealing arrangement can be formed in any suitable manner. As one example, a quantity of sealant or sealing material could be operatively disposed between end member sections 230 and 232, such as is represented by dashed lines FM1 and/or FM2 in FIG. 5, for example. Additionally, or in the alternative, a sealing element could be sealingly disposed between the end member sections. It will be appreciated that sealing element can be of any suitable type, kind and/or configuration, such as an annular sealing ring 300 (e.g., O-ring, quad-ring) and/or a gasket 302 having approximate planar surfaces, for example. In some cases, a groove or recess 304 can be included in section wall 278 that is dimensioned to at least partially receive annular sealing ring 300 or another sealing element. It will be appreciated, however, that other configurations and/or arrangements could alternately be used.

In some cases, end member section 232 can include an end wall extending across end 282 to form a closed end of the end member section. In such cases, end member sections 230 and 232 can substantially form end member chamber 298. Alternately, end 282 of end member section 232 can be an open end. In such cases, end member 204 can include end member section 234, which can be operatively secured to end member section 232 across end 282. In either case, end member chamber 298 can be disposed in fluid communication with spring chamber 208 through opening 246 in end member section 230. It will be appreciated, however, that other configurations and/or arrangements could alternately be used.

End member section 234 can take the form of a base section that supports and secures end member section 232 on or along the associated structural component, such as lower structural component LSC, for example. In this manner, end member section 234 can be used to secure end member 204 on or along the associated structural component (e.g., lower structural component LSC). End member section 234 can include a section wall 306 that extends peripherally about axis AX and includes an end wall portion 308 that is oriented transverse to axis AX. End wall portion 308 can include a bottom surface 310 dimensioned to abuttingly engage an associated structural component (e.g., lower structural component LSC) and an opposing inside surface 312 that together with inside surfaces 262 and 292 can at least partially define end member chamber 298.

Section wall 306 of end member section 234 can also include an outer side wall portion 314 that includes an outer surface 316 and an inner surface 318. Outer surface 316 can extend from along bottom surface 310 toward a distal edge 320 disposed in offset relation to end wall portion 308. In an assembled condition of end member sections 230, 232 and 234, outer surfaces 260, 290 and 316 can at least partially form a smooth and substantially continuous outer surface (e.g., outer surface 222) that extends peripherally around and axially along at least a portion of the end member assembly.

Inner surface 318 can extend from along inside surface 312 toward distal edge 320. End member section 234 can be adapted for securement on or along the associated structural component in any suitable manner. For example, end wall portion 308 and/or outer side wall portion 314 can include one or more securement features dimensioned to receive corresponding securement devices. For example, section wall 306 can include a plurality of threaded holes or passages 322 dimensioned to receive and engage threaded fasteners 216 or other suitable securement devices.

It will be appreciated that end member sections 232 and 234 can be operatively connected with one another in any suitable manner capable of transmitting corresponding axial loads and/or forces therebetween. As one example, flowable adhesive material FM3 could be disposed between end member sections 232 and 234 that is operative to substantially inhibit rotation and/or axial displacement of the first and second end member sections relative to one another and, thus, maintain the securement features thereof in engagement with one another, such as has been discussed above. Additionally, or in the alternative, flowable material FM3 can take the form of a flowable sealant material that is operative to form a substantially fluid-tight joint on, along or otherwise between end member sections 232 and 234. In some cases, the flowable material can at least partially perform both adhesive and sealing functions and/or otherwise provide both features.

Additionally, or in the alternative, end member section 232 can include an annular recess or groove 324 extending into section wall 278 from along outside surface 290. Groove 324 can include at least one engagement surface (not numbered) disposed facing toward end 280 of end member section 232. End member section 234 can include a corresponding annular projection 326 dimensioned to operatively engage groove 324. In a preferred arrangement, annular projection 326 can include a shoulder surface 328 disposed in facing relation to the engagement surface of groove 324. In such case, abutting contact between the engagement surface of annular groove 324 and shoulder surface 328 of annular projection 326 can substantially inhibit inadvertent axial displacement of end member sections 232 and 234 relative to one another.

Together, end member sections 230, 232 and 234 can at least partially define end member chamber 298, which is suitable for storing a quantity of pressurized gas at an elevated pressure, as discussed above. In such cases, a substantially fluid-tight seal is preferably formed between end member sections 232 and 234. It will be appreciated that such a sealing arrangement can be formed in any suitable manner. As one example, a quantity of sealant or sealing material (e.g., flowed material FM3) could be operatively disposed between end member sections 232 and 234. As another example, a sealing element could be sealingly disposed between the end member sections. It will be appreciated that sealing element can be of any suitable type, kind and/or configuration, such as an annular sealing ring 330 (e.g., O-ring, quad-ring) and/or a gasket 332 having approximate planar surfaces, for example. In some cases, a groove or recess 334 can be included in section wall 306 that is dimensioned to at least partially receive annular sealing ring 330 or another sealing element. It will be appreciated, however, that other configurations and/or arrangements could alternately be used.

It will be appreciated that end member assembly 204 can be formed from any combination of one or more materials. In particular, it will be appreciated that end member sections 230, 232 and 234 can be formed any combination of the same or different materials, including one or more end member sections formed from a metal material and/or one or more end member sections formed from a polymeric material. Exemplary materials can include metal materials, such as steel and aluminum, and substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example. Regardless of the material or materials from which end member sections 230, 232 and/or 234 are formed, the one or more securement features thereof are, in a preferred construction, integrally formed on or along the section wall of the end members sections.

With reference to FIG. 3, in some cases, a height or distance sensing device 336 can, optionally, be disposed within spring chamber 208, such as by being secured along end member 202 using suitable fasteners 338. Height sensing device 336 can be of any suitable type, kind and/or construction, such as an ultrasonic sensor that transmits and receives ultrasonic waves WVS, for example. Additionally, it will be appreciated that height sensing device 336 can be connected to other systems and/or components of a vehicle suspension system in any suitable manner. As shown in FIG. 3, for example, height sensing device 336 includes a lead or connection 340 that can be used for such communication purposes, such as is indicated by leads 126 of control system 120 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly having a longitudinal axis and dimensioned for securement to an associated flexible spring member for forming an associated gas spring assembly, said end member assembly comprising:
   a first end member section including a first section wall extending peripherally about said longitudinal axis, said first section wall including:
      a mounting wall portion dimensioned to receivingly engage the associated flexible spring member;
      a first side wall portion disposed radially outward of said mounting wall portion and including a first inner surface portion and a first outer surface portion with said first outer surface portion extending axially away from said mounting wall portion toward a first shoulder surface portion oriented transverse to said longitudinal axis; and,
      a first helical thread integrally formed on or along said first section wall;
   a second end member section including a second section wall extending peripherally about said longitudinal axis, said second section wall including:
      a second side wall portion extending longitudinally between a first end disposed toward said first end member section and a second end disposed away from said first end member section relative to said first end, said second side wall portion including a second inner surface portion and a second outer surface portion with said second outer surface portion extending toward a first end surface portion disposed along said first end and oriented transverse to said longitudinal axis; and,
      a second helical thread integrally formed on or along said second section wall, said second helical thread dimensioned to cooperatively engage said first helical thread such that in an assembled condition of said first and second end member sections:
         said first and second helical threads operatively engage one another to form a first threaded connection that substantially inhibits axial displacement of said first and second end member sections relative to one another;
         said first shoulder surface portion and said first end surface portion face one another and form a first section interface between said first and second end member sections with said first threaded connection extending axially from along said first section interface;
         said first and second outer surface portions form a smooth and substantially continuous outer surface axially along at least a portion of said end member assembly with said first section interface disposed axially between said first and second outer surface portions such that the associated flexible spring member extends coextensively with said first threaded connection and axially across said first section interface; and,
         said first and second inner surface portions at least partially define an end member chamber.

2. An end member assembly according to claim 1 further comprising a third end member section including a third section wall extending peripherally about said longitudinal axis, said third end member section disposed in operative engagement with said second end member section along said second end of said second section wall with said second end of said second section wall including an opening formed therealong and said third end member section extending at least partially across said opening to further define said end member chamber.

3. An end member assembly according to claim 2, wherein a substantially fluid-tight seal is formed between said second and third end member sections.

4. A gas spring assembly comprising:
   a flexible spring member having a longitudinal axis and including a flexible wall extending peripherally about said longitudinal axis between a first end and a second end of said flexible spring member to at least partially define a spring chamber therebetween;
   an end member secured across said first end of said flexible spring member such that a substantially fluid-tight connection is formed therebetween; and,
   an end member assembly according to claim 1 secured across said second end of said flexible spring member such that a substantially fluid-tight connection is formed therebetween.

5. An end member assembly having a longitudinal axis and dimensioned for securement to an associated flexible spring member for forming an associated gas spring assembly, said end member assembly comprising:
   a first end member section including a first section wall extending peripherally about said longitudinal axis, said first section wall including:
      a mounting wall portion dimensioned to receivingly engage the associated flexible spring member;
      a first outer wall portion disposed radially outward of said mounting wall portion and including a first inner surface portion and a first outer surface portion with said first outer surface portion extending axially away from said mounting wall portion toward a first shoulder surface portion oriented transverse to said longitudinal axis; and,
      a first securement feature extending helically around said longitudinal axis along said first section wall; and,
   a second end member section including a second section wall extending peripherally about said longitudinal axis, said second section wall including:
      a second outer wall portion extending longitudinally between a first end disposed toward said first end member section and a second end disposed away from said first end member section relative to said first end, said second outer wall portion including a second inner surface portion and a second outer surface portion with said second outer surface portion extending toward a first end surface portion disposed along said first end and oriented transverse to said longitudinal axis; and,
      a second securement feature extending helically around said longitudinal axis along said second section wall, said second securement feature cooperatively engaging said first securement feature such that in an assembled condition of said first and second end member sections:
         said first and second securement features operatively engage one another forming a helically-interengaged connection substantially inhibiting axial displacement of said first and second end member sections relative to one another;
         said first shoulder surface portion and said first end surface portion face one another and form a first section interface between said first and second end member sections;

said first and second outer surface portions form a smooth and substantially continuous outer surface axially along at least a portion of said end member assembly with said first section interface disposed axially between said first and second outer surface portions such that the associated flexible spring member extends coextensively with said helically-interengaged connection; and, said first and second inner surface portions at least partially define an end member chamber.

6. An end member assembly according to claim 5, wherein said first securement feature is disposed radially between said first inner surface portion and said first outer surface portion of said first outer wall portion.

7. An end member assembly according to claim 5, wherein said second securement feature is disposed radially between said second inner surface portion and said second outer surface portion of said second outer wall portion.

8. An end member assembly according to claim 5, wherein at least one of said first and second securement features includes one or more projections extending in a helical arrangement about said longitudinal axis.

9. An end member assembly according to claim 5, wherein one of said first and second securement features includes at least one groove extending helically about said longitudinal axis.

10. An end member assembly according to claim 5, wherein said first securement feature includes one or more first helical threads extending along said first section wall and said second securement feature includes one or more second helical threads extending along said second section wall with said first and second helical threads dimensioned to cooperatively engage one another to secure said first and second end member sections to one another.

11. An end member assembly according to claim 5, wherein said first and second securement features are first and second primary securement features, and at least one of said first and second end member sections includes a secondary securement feature operative to maintain said first and second primary securement features in engagement with one another.

12. An end member assembly according to claim 5, wherein said first section wall of said first end member section includes a first secondary securement feature, and said second section wall of said second end member section includes a second secondary securement feature dimensioned to cooperatively engage said first secondary securement feature.

13. An end member assembly according to claim 5, wherein one of said first and second section walls includes a radial recess, and the other of said first and second section walls includes a retention arm dimensioned to cooperatively engage said radial recess in an assembled condition of said first and second end member sections.

14. An end member assembly according to claim 5 further comprising a third end member section including a third section wall extending peripherally about said longitudinal axis, said third end member section disposed in operative engagement with said second end member section along said second end of said second section wall.

15. An end member assembly according to claim 14, wherein said third section wall of said third end member section includes a third outer surface portion with said second and third outer surface portions cooperatively forming a smooth and substantially continuous outer surface axially along at least a portion of said end member assembly.

16. A gas spring assembly comprising:
a flexible spring member having a longitudinal axis and including a flexible wall extending peripherally about said longitudinal axis between a first end and a second end of said flexible spring member to at least partially define a spring chamber therebetween;
an end member secured across said first end of said flexible spring member such that a substantially fluid-tight connection is formed therebetween; and,
an end member assembly according to claim 5 secured across said second end of said flexible spring member such that a substantially fluid-tight connection is formed therebetween.

17. An end member assembly having a longitudinal axis and dimensioned for securement to an associated flexible spring member for forming an associated gas spring assembly, said end member assembly comprising:
a first end member section including a first section wall extending peripherally about said longitudinal axis, said first section wall including:
a mounting wall portion dimensioned to receivingly engage the associated flexible spring member;
a first side wall portion disposed radially outward of said mounting wall portion and including a first inner surface portion and a first outer surface portion; and,
a first helical thread integrally formed on or along said first section wall;
a second end member section including a second section wall extending peripherally about said longitudinal axis, said second section wall including:
a second side wall portion extending longitudinally between a first end disposed toward said first end member section and a second end disposed away from said first end member section relative to said first end, said second side wall portion including a second inner surface portion and a second outer surface portion; and,
a second helical thread integrally formed on or along said second section wall, said second helical thread dimensioned to cooperatively engage said first helical thread such that in an assembled condition of said first and second end member sections:
said first and second helical threads operatively engage one another to form a first threaded connection that substantially inhibits axial displacement of said first and second end member sections relative to one another;
said first and second outer surface portions form a smooth and substantially continuous outer surface axially along at least a portion of said end member assembly with said first section interface disposed axially between said first and second outer surface portions such that the associated flexible spring member extends coextensively with said first threaded connection; and,
said first and second inner surface portions at least partially define an end member chamber.

18. An end member assembly according to claim 17, wherein said first outer surface portion of said first side wall portion extends axially away from said mounting wall portion toward a first shoulder surface portion that is oriented transverse to said longitudinal axis, said second outer surface portion of said second side wall portion extends toward a first end surface portion disposed along said first end and oriented transverse to said longitudinal axis, and said first shoulder surface portion and said first end surface portion face one another and form a first section interface between said first and second end member sections with said first threaded connection extending axially from along said first section interface and the associated flexible spring member extends axially across said first section interface.

19. An end member assembly according to claim 17, wherein said first threaded connection extends axially along said end member assembly between said first inner surface portion and said second outer surface portion, between said first outer surface portion and said second inner surface portion, or between said first inner surface portion and said second outer surface portion and between said first outer surface portion and said second inner surface portion.

20. A gas spring assembly comprising:
- a flexible spring member having a longitudinal axis and including a flexible wall extending peripherally about said longitudinal axis between a first end and a second end of said flexible spring member to at least partially define a spring chamber therebetween;
- an end member secured across said first end of said flexible spring member such that a substantially fluid-tight connection is formed therebetween; and,
- an end member assembly according to claim 17 secured across said second end of said flexible spring member such that a substantially fluid-tight connection is formed therebetween.

* * * * *